United States Patent [19]

Rudolf et al.

[11] 4,302,416

[45] Nov. 24, 1981

[54] METHOD AND APPARATUS FOR MOLDING POLYURETHANE SOLES FOR FOOTWEAR

[76] Inventors: Guy Rudolf, 10 Jean Drouilly, Vernon; Giuliano Frau, 3 Les Bruyeres, St. Nom la Breteche, both of France

[21] Appl. No.: 78,720

[22] Filed: Sep. 25, 1979

[51] Int. Cl.³ .................................... A43D 65/00
[52] U.S. Cl. ............................. 264/244; 264/250; 264/294; 264/DIG. 57; 264/DIG. 77; 425/119; 425/129 S; 425/543; 425/588
[58] Field of Search ....... 264/244, 250, 294, DIG. 57, 264/DIG. 77, DIG. 59; 425/543, 588, 119, 129 S

[56] References Cited

U.S. PATENT DOCUMENTS

| 3,555,609 | 1/1971 | Chu et al. ........................ 264/244 |
| 3,682,579 | 8/1972 | Hujik ............................... 264/244 |
| 4,090,831 | 5/1978 | Hujik ............................... 425/488 |

FOREIGN PATENT DOCUMENTS

977917 11/1975 Canada.

*Primary Examiner*—Donald E. Czaja
*Assistant Examiner*—W. Thompson
*Attorney, Agent, or Firm*—Holman & Stern

[57] ABSTRACT

Two component polyurethane soles for footwear are molded continuously in an apparatus including a turntable with a plurality of mold stations therearound. While a first sole portion is being molded at one mold station, a second sole portion interconnecting the first sole portion to a lasted upper is molded at the same mold station. Such simultaneous molding is achieved using a mold bottom or top which retains the first sole portion and with such first sole portion forms part of the mold for forming the second sole portion. The second sole portion mold is completed by mold sides and a lasted upper.

13 Claims, 19 Drawing Figures

METHOD AND APPARATUS FOR MOLDING POLYURETHANE SOLES FOR FOOTWEAR

BACKGROUND OF THE INVENTION

1. Field of the Invention

This invention relates to a method and an apparatus for molding polyurethane soles for footwear.

More specifically, the invention relates to the molding of soles for footwear using polyurethane of two different colors and/or physical and chemical properties. In the production of soles for sports shoes or the like, it is common practice to use a single material such as polyurethane or polyvinyl chloride; and to make the soles in two separate and distinct molding operations using different compositions for the two sole portions. The resulting soles have two differently colored portions and/or two portions with different properties such as hardness.

2. Discussion of Prior Art

One conventional two color molding technique is disclosed, for example, in applicant's Canadian Pat. No. 977,917, issued Nov. 18, 1975. In the conventonal method, a first mold cavity is formed at a first molding station where a first injection of moldable material is effected, and the mold is moved to a second molding station where a second mold cavity is formed and a second moldable material is injected into the second mold cavity. The first mold cavity is formed by a mold top in the form of a dummy last, mold sides or side rings and a mold piston. The second mold cavity is defined by the mold piston and first sole portion thereon, a lasted upper and different portions of the mold sides or another set of mold sides. In such a method, it is necessary to inject the moldable material at two separate locations to permit the first sole portion to at least partially cure to a hardness sufficient to prevent deformation thereof during the second injection. With the large injection units used to inject polyvinyl chloride, only one injection unit can be present at any one molding station.

It will be appreciated that the conventional method requires a large turntable with a plurality of molds—usually 20–24—in order to operate efficiently and economically. With a material such as polyurethane which requires an approximate 3 minute curing time, a large apparatus has been a necessity. Moreover, for two color injection a four component dispensing system is required, i.e. resin and hardener containers must be provided at each of the two molding stations. When injecting at two separate, spaced apart locations, the edge of the mold containing the injection port for the second material becomes clogged during the first injection step, thus making injection of the second material difficult if not impossible.

Thus, it is readily apparent that there exists a need for a simple method and apparatus for injecting two component polyurethane or the like. By two component is meant polyurethane of two different colors, or polyurethane compositions having different physical and/or chemical properties for each molding operation. Alternatively, two similar compositions can be used.

The object of the present invention is to provide a method and an apparatus for injecting two component polyurethane soles for footwear which are relatively simple and which facilitate the production of such soles.

According to one aspect of the invention, there is provided a method for molding two component soles for footwear of polyurethane or the like comprising the steps of molding a first sole portion at a first molding station; moving the first sole portion along a path of travel such that it returns to said first molding station after a predetermined period permitting at least partial curing of the first sole portion; and thereafter simultaneously molding a second sole portion on said first sole portion and a new, separate first sole portion at said first molding station.

According to another aspect of the invention, there is provided an apparatus for molding two component soles for footwear of polyurethane or the like comprising a turntable; a plurality of spaced apart mold bottoms carried by said turntable; mold top means carried by said turntable for forming a first mold cavity with each of said mold bottoms one at a time; mold sides; a plurality of lasts carried by said turntable for receiving uppers and forming second mold cavities with said mold bottoms and mold sides; said lasts being equal in number to said mold bottoms; and means for simultaneously injecting one component into a first mold cavity and the second component into a second mold cavity, whereby simultaneously to complete a two component sole and mold a new, separate first sole portion.

By simultaneously injecting one component of a two component sole into one mold and a second component of a two component sole into another mold at the same molding station, the number of molding stations can be substantially reduced. Moreover, after the initial injection of a first component into a plurality of molds on a turntable to form a plurality of first sole portions, simultaneous injection of the second component to complete the soles and injection of new first components can take place on a continuous basis. It is also possible to use a single source of polyurethane resin and a single injection unit. With such an arrangement, three material feed systems are required instead of four. One feed system supplies the polyurethane resin to a pair of mixing devices, the second system supplies the hardener and other materials, e.g. coloring agents to the first component mixing device and injection nozzle, and the third system supplies the hardener and other materials to the second component mixing device and injection nozzle. Thus, not only do the method and apparatus of the present invention facilitate production, but they can lead to a substantial saving in machinery costs. The use of a single injection unit having two nozzles means that the safety features normally required are also reduced in number, i.e. safety features may be required for one injection unit instead of two.

With the method and apparatus of the present invention, the molds pass an operator immediately before molding operations, and the face of the molds containing the injection ports can be cleaned. In known two component molding methods, molding of one component occurs at a first molding station and molding of a second component occurs at a second molding station remote from the first station. Thus, if the second injection port becomes blocked during the first molding step, it may be difficult or impossible to effect the second molding step unless an operator is present to clean the face of the mold containing the injection ports. In other words, instead of two cleaning operations for molding at two separate locations, only one cleaning operation is required with the method and apparatus of the present invention.

DESCRIPTION OF PREFERRED EMBODIMENTS

Figure 1:
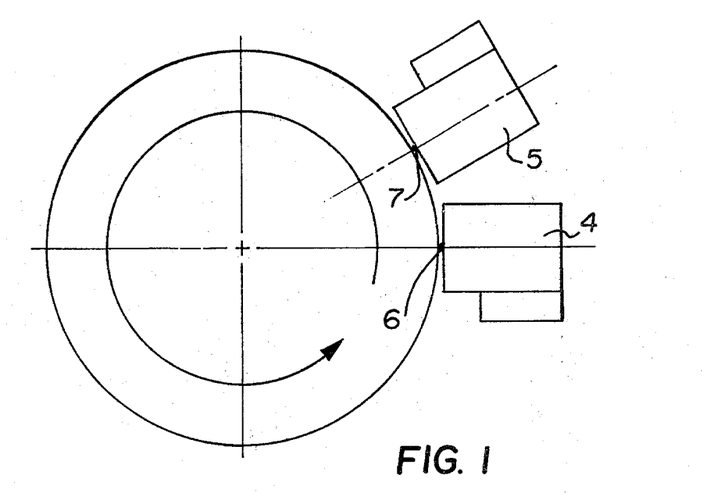
FIG. 1 is a schematic plan view of a molding apparatus in accordance with the present invention.
Figure 2:
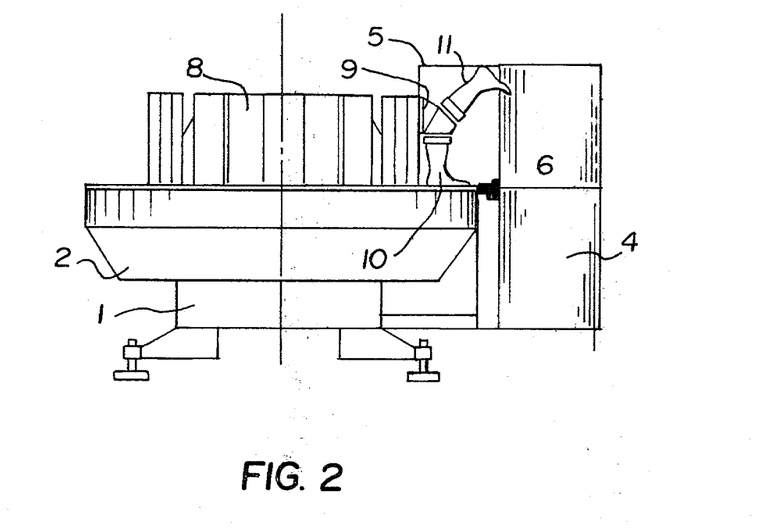
FIG. 2 is a schematic elevation view of the apparatus of FIG. 1.

With reference to the drawings and in particular to FIGS. 1 and 2, the molding apparatus of the present invention includes a base 1 resting on the floor and a turntable 2 rotatably mounted on the base 1 for rotation about the vertical longitudinal axis of the machine. The turntable 2 is generally circular and is provided with a plurality of molds (not shown in FIGS. 1 and 2) spaced equidistant apart about the periphery of the turntable for receiving a liquid polyurethane mixture from a pair of injection units 4 and 5. Polyurethane resin, hardener and any desired additives are fed into the units 4 and 5 and then injected into the molds via nozzles 6 and 7, respectively. The two injection units 4 and 5 can be replaced by a single unit (not shown) with a pair of nozzles and separate mixing facilities. The separate mixing facilities would both be connected to a single source of polyurethane resin, and to separate sources of hardener and additives. The two injection units 4 and 5 or the pair of nozzles on the single unit are located at one molding station for simultaneously injecting polyurethane into two separate molds.

A central column 8 on the turntable 2 is provided with last holders 9 (one shown) located above the turntable, the number of last holders 9 being equal to the number of molds. Each last holder 9 supports a dummy or false last 10 on one surface and a last 11 on an opposite surface thereof, or alternatively a pair of lasts on such surfaces. The last holders 9 are rotatably and vertically slidable on the column 8 so that a first mold cavity can be formed using a false last 10 to produce a first sole portion. Conventionally, after formation of the first sole portion, the false last 10 is then raised to open the first mold which is moved with the turntable 8 to a second molding station. Before reaching the second molding station, the last holder 9 is rotated so that a lasted upper, i.e. an upper on the last 11 extends downwardly. The lasted upper is moved downwardly to close the mold at a second molding station, a second sole portion is molded using a second injection unit, and the lasted upper with the complete sole is moved upwardly to open the mold. Finally, the completed article of footwear is moved with the turntable to an unloading station which corresponds to the loading station for uppers. Thereafter, the method is repeated continuously.

Figures 3, 4, 5:
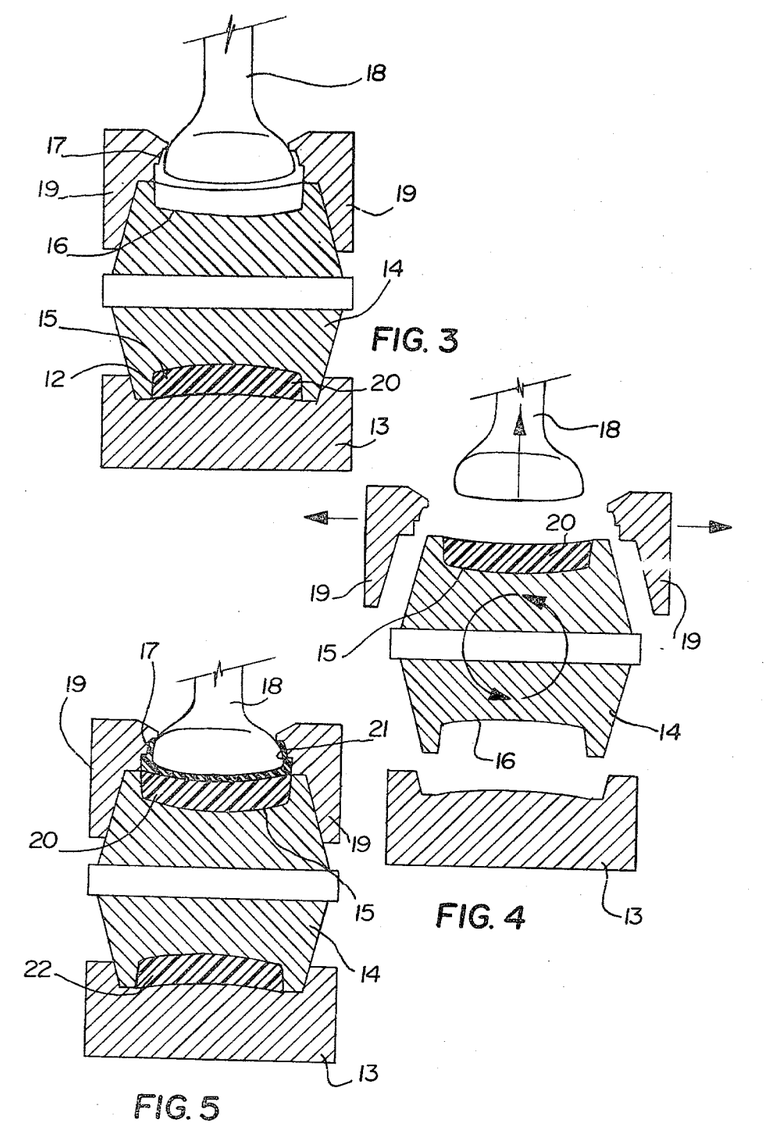
FIGS. 3 to 5 are schematic cross-sectional views of molds and sole components during molding in accordance with one embodiment of the method of the present invention.

Referring now specifically to FIGS. 3 to 5, in accordance with the method of the present invention, first and second sole portions of a two component sole are molded separately and simultaneously at a single molding station using a pair of injection units or a single injection unit with two separate injection nozzles. The first step in the method is to form a first mold cavity 12 using a false last, which is in the form of a vertically movable mold bottom 13, and a double faced sole plug 14. The sole plug 14 is rotatably mounted on a turntable 2. The two faces of the sole plug 14 contain recesses 15 and 16 for defining the first mold cavity 12 and a second mold cavity 17. Initially, the second mold cavity 17 is formed by a last 18 with an upper thereon (hereinafter referred to as a lasted upper), side molds 19 and the face of the sole plug 14 containing the recess 16. A first component in the form of a mixture of polyurethane resin, hardener and other additives is injected into the first mold cavity 12 to form a first sole portion 20. In the same manner, a first sole portion is formed in each of a plurality of molds of the above-described type on a turntable (not shown). The first sole portions 20 ultimately form the outer or bottom portion of the sole.

Figure 6:
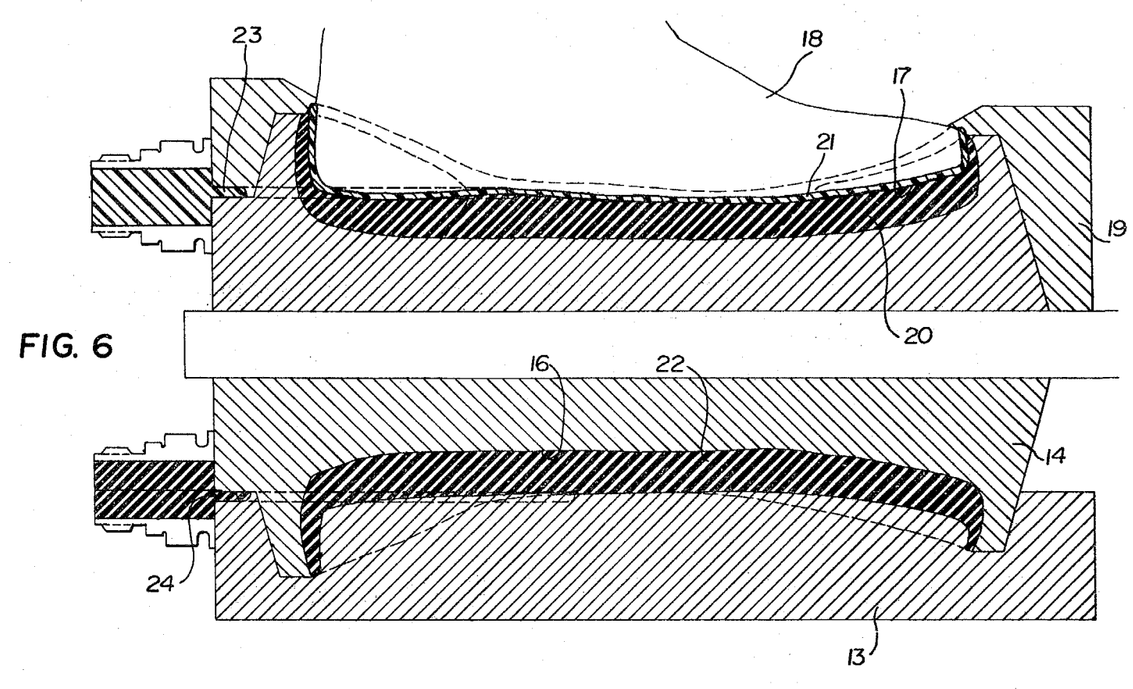
FIG. 6 is a longitudinal sectional view of the molds and sole components of FIG. 5.

Upon completion of all of the first sole portions 20, the first mold, having completed a circular path of travel, returns to the molding station. However, before reaching such molding station, both mold cavities 12 and 17 are opened by moving the false last 13 downwardly, moving the side molds 19 apart and moving the lasted upper 18 upwardly, leaving the first sole portion 20 in the recess 15 in the sole plug 14. The sole plug 14 is rotated to a position in which the lasted upper 18 is opposed by the first sole portion 20, and the empty recess 16 in the opposite face of the sole plug 14 opposes the mold bottom or false last (FIG. 4). Finally, the mold is closed to form new mold cavities, and a second sole portion 21 (FIGS. 5 and 6) is molded using a second color polyurethane or a polyurethane composition having different properties from that used in the first sole portion 20. At the same time as the second sole portion 21 is being molded, i.e., simultaneously with the injection of the second component into the mold cavity 17 via an injection port 23, a second batch or shot of first component is injected into the mold cavity defined by the recess 16 and the mold bottom 13 via an injection port 24. It is readily apparent that the second sole portion 21 forms an inner sole on the outer sole (first sole portion 20). It is also apparent that after all of the first sole portions are molded initially, the second mold cavities are formed by a first sole portion on the sole plug 14, a lasted upper 18 and the mold sides 19. Following completion of the initial molding of the first sole portions, the method is continuous.

Figure 7:
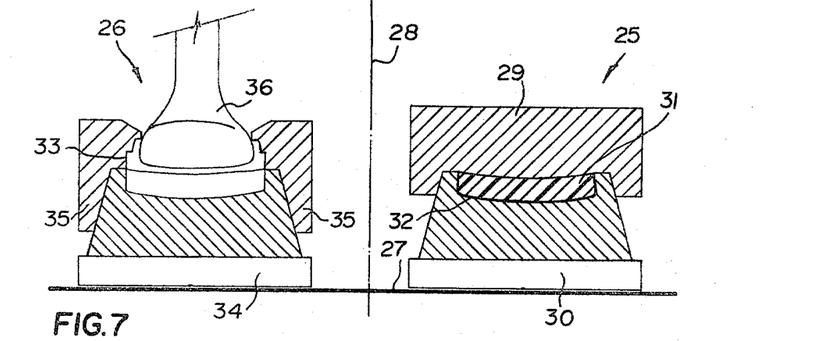
FIGS. 7 to 9 are schematic cross-sectional views of molds and sole components during molding in accordance with a second embodiment of the method of the present invention.
Figure 8:
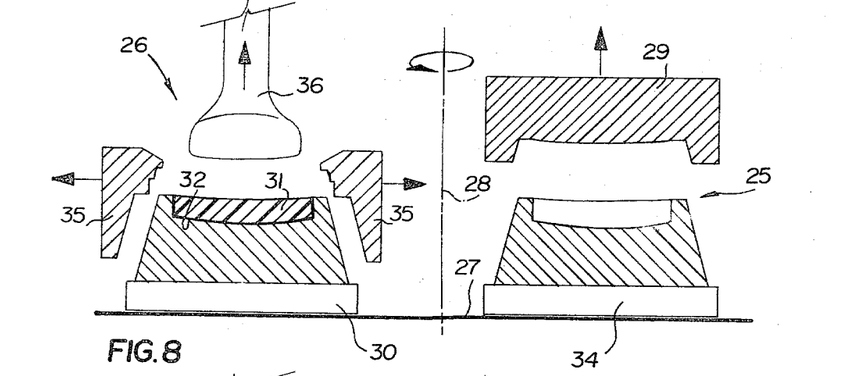
Figure 9:
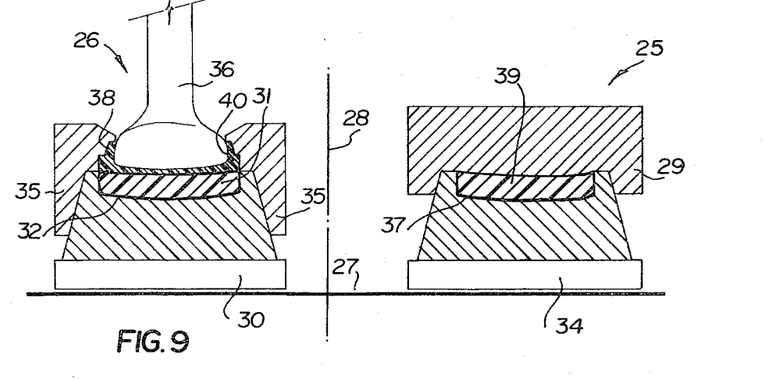

Referring now to FIGS. 7 to 9, in accordance with a second embodiment of the present invention, first and second molds generally indicated at 25 and 26 are formed on a single plate 27, which is rotatable about a vertical axis 28. In a first molding operation, a first mold 25 including a vertically movable mold top or false last 29 and a sole plug or mold bottom 30, is closed by moving the false last 29 downwardly onto the mold bottom 30 and a first sole portion 31 is molded by injecting a first polyurethane composition into mold cavity 32. At the same time, the second mold 26 is closed to form a mold cavity 33 on the opposite side of the top surface of the plate 27. The second mold 26 is formed by a mold bottom 34, mold sides 35 and lasted upper 36.

Upon completion of the first sole portion 31, the molds 25 and 26 are opened by moving the false last 29 upwardly, by moving the mold sides 35 apart and the lasted upper 36 upwardly, and the plate 27 is rotated about the axis 28 to reverse the positions of the mold bottoms 30 and 34 (FIG. 8). A new mold cavity 37 similar to cavity 32 is formed using the false last 29 and the mold bottom 34; and a new mold cavity 38 similar to cavity 33 is formed using the first sole portion 31 on the mold bottom 30, the mold sides 35 and the lasted upper 36. As illustrated in FIG. 9, a new first sole portion 39 is formed in the mold cavity 37, and simultaneously, a second sole portion 40 is molded in the mold cavity 38. Thereafter, the method is continuous. While a first sole portion is being molded in one mold 25, a second sole portion is being molded in the second mold 26 at a single molding station using a pair of injection units 4 and 5 (FIGS. 1 and 2) or a single injection unit with two injection nozzles.

Figure 10:
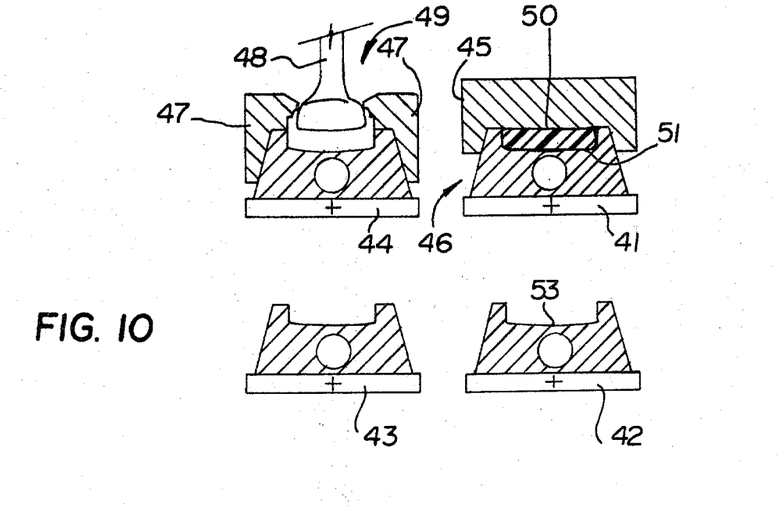
FIGS. 10 to 13 are schematic cross-sectional views of molds and sole components during molding in accordance with a third embodiment of the method of the present invention.
Figure 11:
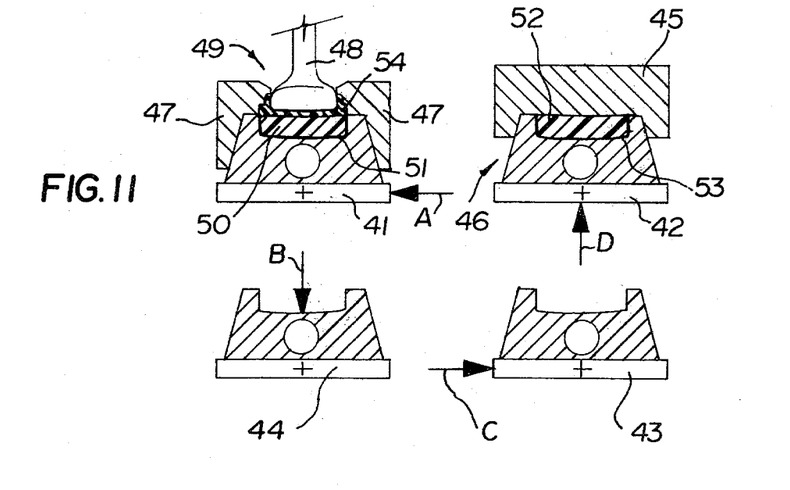
Figure 12:
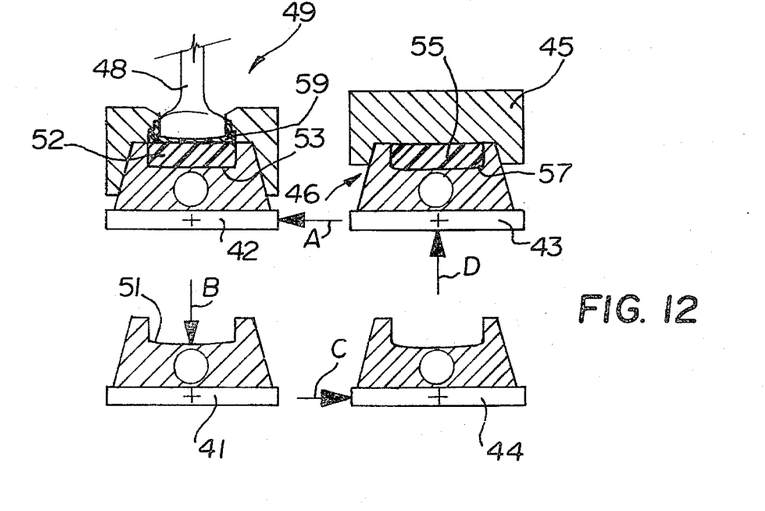
Figure 13:
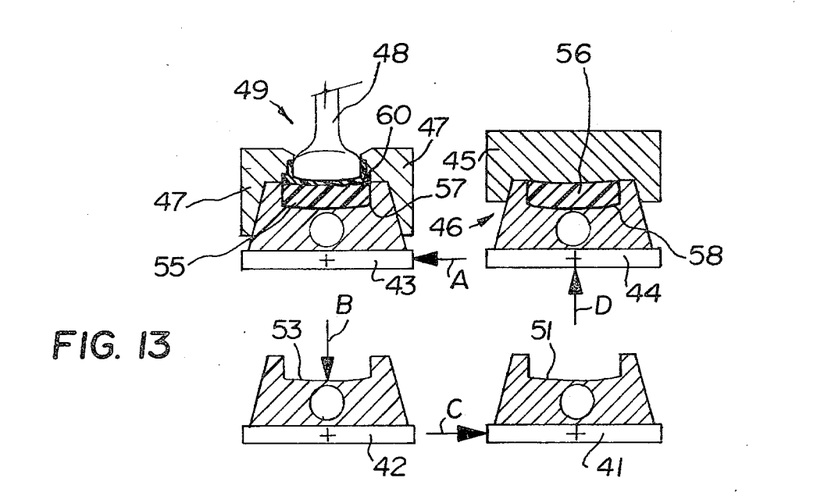

In another embodiment of the method of the present invention illustrated in FIGS. 10 and 13, four mold bottoms 41, 42, 43 and 44 are utilized with a single mold top or false last 45 to form one mold generally indicated at 46, and with side molds 47 and a lasted upper 48 to form a second mold generally indicated at 49. The sequence of operation is essentially the same as in the other embodiments of the invention. The mold bottoms move in a generally rectangular path of travel. Firstly, the molds 46 and 49 are closed, with the mold bottom 41 forming the base of the mold 46, and a first sole portion 50 is molded in recess 51 in the top of the mold bottom 41 (FIG. 10). The molds 46 and 49 are opened, and the mold bottoms are moved to the next adjacent corner of the rectangular path of travel in the directions of arrows A, B, C and D (FIG. 11). A second set of molds 46 and 49 are formed, the mold bottom 41 forming the base of the mold 49 and the mold bottom 42 forming the base of the mold 46. Another first sole portion 52 is molded in recess 53 in the top of the mold bottom 42, and simultaneously a second sole portion 54 is molded onto the bottom of the lasted upper 48. The mold bottom moving steps and double molding operations are repeated for each of the mold bottoms, first sole portions 55 and 56 being molded in recesses 57 and 58 in the mold bottoms 43 and 44, respectively, and second sole portions 59 and 60 being molded in the mold 49 on the first sole portions 52 and 55, respectively. Thereafter, the method is continuous. In the next simultaneously molding operations, a new first sole portion is molded in the recess 51 in the mold bottom 41 and a second sole portion is molded onto the first sole portion 56 in the mold bottom 44. By continuously moving the mold bottoms in the direction of arrows A, B, C and D, the two component soles can readily be mass produced.

Figures 14, 15, 16:
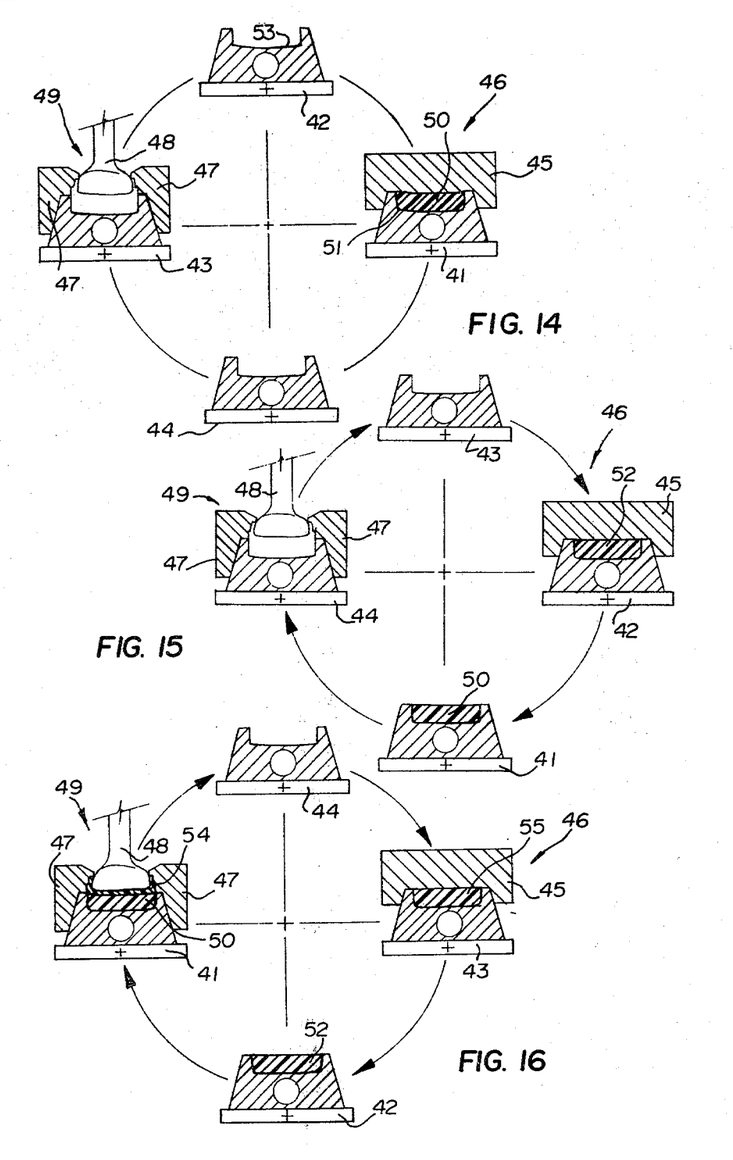
FIGS. 14 to 16 are schematic cross-sectional views of molds and sole components during molding in accordance with a fourth embodiment of the method of the present invention.

In FIGS. 14 to 16 the same reference numerals are used to identify elements similar to those in FIGS. 10 to 13.

The apparatus and method of FIGS. 14 to 16 are similar to those of FIGS. 10 to 13, except that the mold bottoms 41, 42, 43 and 44 are moved through a circular, clockwise path of travel. A series of molds 46 are formed using the mold bottoms 41, 42, 43 and 44, and a mold top or false last 45. By the time a first sole portion 55 is being molded in the mold bottom 43, a second sole portion 54 is being molded onto, between and bonded to the lasted upper 48 and the first sole portion 50. Thereafter, the process is continuous, with the mold bottoms 41, 42, 43 and 44 virtually constantly in use, and the simultaneous injection of the first and second components being effected during each molding operation.

Of course, in each of the methods of FIGS. 10 to 13 and 14 to 16, the finished sole can and preferably is retained in the mold 49 until it reaches a location immediately before the location of the mold 46. This would provide sufficient time for complete curing. Moreover, the molds 46 and 49 would be opened simultaneously, new molds closed, and the mold injection ports cleaned simultaneously.

Figure 17:
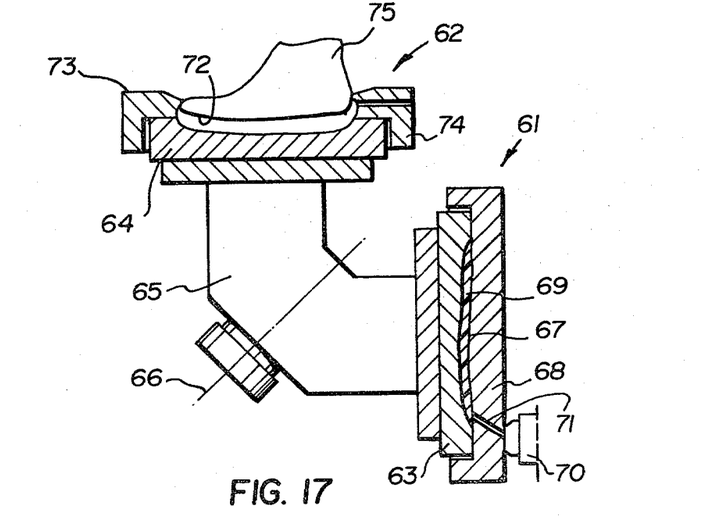
FIGS. 17 to 19 are schematic, partly sectioned views of molds and sole components or portions during molding in accordance with a fifth embodiment of the method of the present invention.
Figure 18:
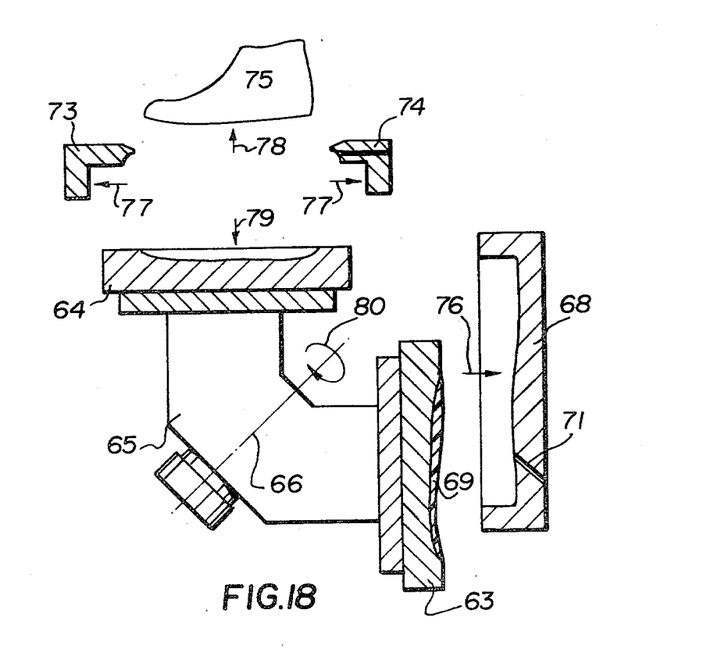
Figure 19:
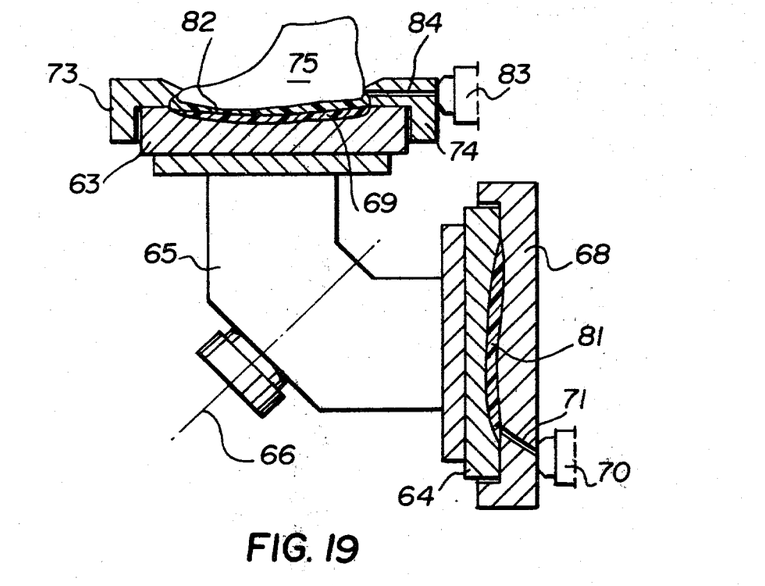

With reference to FIGS. 17 to 19, in accordance with the fifth embodiment of the invention first and second molds generally indicated at 61 and 62 are provided at each molding station on the turntable 2 (FIGS. 1 and 2). The molds 61 and 62 are defined in part by a pair of mold bottoms 63 and 64 mounted on the outer free ends of a generally L-shaped carrier 65. The carrier 65 is rotatably mounted on the turntable for rotation around an inclined axis 66, which extends through the corner of the L (in this case through the point where such corner would be).

Referring to FIG. 17, the mold bottom 63, which is vertically disposed in the first molding position, forms a first mold cavity 67 with a mold top or false last 68. A first sole portion 69 is injected into the mold cavity 67 through a nozzle 70 and a molding port 71 in the mold top 68. At the same time, a second mold cavity 22 is formed on the mold bottom 64 using mold sides 73 and 74, and a lasted upper 75.

Upon completion of the first molding operation, the mold 61 is opened by moving the mold top 68 outwardly in the direction of arrow 76 (FIG. 18), leaving the first sole portion 69 on the mold bottom 63. The mold 62 is also opened by moving the mold sides 73 and 74 outwardly in the directions of arrows 77, moving the lasted upper 75 upwardly (arrow 78) and moving the mold bottom 64 downwardly (arrow 79). Of course, because the mold bottom 64 is mounted on the carrier 65, it is necessary to move the whole carrier and both mold bottoms 63 and 64 downwardly. The carrier 65 is then rotated around the inclined axis 66 in the direction of arrow 80, so that the mold bottom 64 assumes the vertical orientation and the mold bottom 63 assumes the top, horizontal position (FIG. 19).

In the second molding position, the molds are again closed. A new first mold cavity is defined by the mold bottom 64 and the mold top 68, and a new first sole portion 81 is injected into the mold cavity via the port 71. At the same time, a second mold cavity is defined by the mold bottom 63 and the first sole portion 69, mold sides 73 and 74, and the lasted upper 75. A second sole portion 82 is injected into the second mold cavity through an injection nozzle 83 and a molding port 84 in the mold side 74.

It will be appreciated that the first sole portions form the outer or bottom portions of the sole, and the second sole portions form the inner or so-called midsole which connects the outer sole portion to the lasted upper.

In the first embodiment of the apparatus described hereinbefore (FIGS. 3 to 5), the top surface of the mold bottom 13 is coated with polytetrafluoroethylene, which facilitates separation of the mold bottom from the first sole portion. By the same token, the mold top or false last used to form the first mold in the apparatus of FIGS. 7 to 16 can be coated with polytetrafluoroethylene.

We claim:

1. A method of molding two component soles for footwear of polyurethane in an apparatus including a turntable carrying molds, said method comprising the steps of (a) molding a first sole portion at a first molding station in a first position on one side of said turntable; (b) moving the first sole portion along a path of travel such that it returns to a second position at said first molding station on said one side of the turntable after a predetermined period of time permitting at least partial curing of said first sole portion; (c) simultaneously molding a second sole portion on said first sole portion at said second position to complete a sole and molding another, separate first sole portion at said first position at said first molding station on said one side of the turntable; and (d) repeating steps (a) to (c) an indefinite number of times, whereby first and second sole portions are continuously molded separately and simultaneously at a single molding station on one side of the turntable.

2. A method according to claim 1, wherein said first sole portion is molded in a mold cavity defined by a recess in one face of a sole plug, and a mold bottom opposing said recess; and said second sole portion is molded in a second mold cavity defined by a first sole portion in said sole plug, mold sides and a lasted upper, whereby the second sole portion is interposed between and interconnects the first sole portion and a lasted upper.

3. A method according to claim 1, wherein said first sole portion is molded at said first molding station in a first mold defined by a first mold bottom and a top, said first mold is opened by moving the mold top upwardly away from the first mold bottom leaving the first sole portion in the mold bottom; said first mold bottom and first sole portion are moved to a second molding location at the same time location or in close proximity to said first molding station and on said one side of the turntable, and a second mold bottom replaces the first mold bottom beneath the mold top; a new first mold is formed with said second mold bottom and said mold top; a second mold is formed using said first mold bottom and first sole portion, mold sides and a lasted upper; and the second sole portion is molded in said second mold while another first sole portion is molded in said new first mold.

4. A method according to claim 3, wherein during movement to said second molding location, said first mold bottom and first sole portion are rotated about a vertical axis to the second molding location.

5. A method according to claim 3, wherein during movement to said second molding location, said first mold bottom and first sole portion are moved horizontally.

6. A method according to claim 3, wherein during movement to said second molding location, said first mold bottom and first sole portion are moved along a portion of a circular path of travel, the path of travel having a horizontal axis.

7. A method according to claim 1, wherein said first sole portion is molded in a first mold cavity defined by a recess in a mold bottom and a mold top opposing said recess; and said second sole portion is molded in a second mold cavity defined by a first sole portion in said mold bottom, mold sides and a lasted upper, whereby the second sole portion is interposed between and interconnects the first sole and a lasted upper.

8. An apparatus for molding two component soles for footwear of polyurethane comprising a turntable rotatable around a vertical axis; a plurality of spaced apart mold bottoms carried by said turntable; mold top means carried by said turntable, said mold bottoms and top means being movable with respect to each other for forming a first mold with each of said mold bottoms one at a time at a first position at a first molding station on one side of said turntable for molding a first sole portion at said first molding station; mold sides; a plurality of lasts carries by said turntable for receiving uppers and forming second molds with said mold tops or mold bottoms and mold sides for molding a second side portion between said first sole portion and an upper at said first molding station on said one side of the turntable, said lasts being equal in number to said mold tops and mold bottoms; and a pair of injection means for simultaneously injecting one component into the first mold and the second component into a second mold at said first molding station on said one side of the turntable, whereby to complete a two component sole and separately and simultaneously mold a first side portion at said first molding station.

9. An apparatus according to claim 8, wherein said mold top means are sole plugs rotatably mounted on said turntable, one sole plug being located above each mold bottom; each said sole plug having a pair of recesses in opposite surfaces thereof, whereby such opposite surfaces of the sole plug simultaneously form a mold top of a first mold and a mold bottom in a second mold.

10. An apparatus according to claim 8, including a plate mounted for rotation about a vertical axis at each of a plurality of molding stations on said turntable; a pair of mold bottoms mounted on the top surface of said plate; a mold top carried by said turntable for forming said first mold with one of said mold bottoms on said plate while an upper on one said last simultaneously forms a second mold with the other mold bottom and a completed first sole portion on said plate.

11. An apparatus according to claim 8, including a plurality of mold bottoms at each of a plurality of mold stations on said turntable; means for moving said mold bottoms along a rectangular path of travel; a mold top carried by said turntable for sequentially forming first molds with said mold bottoms while an upper on said last simultaneously and sequentially forms second molds with others of said mold bottoms and completed first sole portions.

12. An apparatus according to claim 8, including a plurality of mold bottoms at each of a plurality of mold stations on said turntable; means for moving said mold bottoms along a circular path of travel, the circle having a horizontal axis; a mold top carried by said turntable for sequentially forming first molds with said mold bottoms while an upper on said last simultaneously and sequentially forms second molds with others of said mold bottoms and completed first sole portions.

13. An apparatus according to claim 8, including a plurality of generally L-shaped carriers equal in number to the number of lasts on said turntable, each carrier carrying a pair of mold bottoms at a right angle to each other, one said mold bottom being vertically oriented and the other mold bottom being horizontally oriented; a single mold top for each pair of mold bottoms for forming the first mold with the vertically oriented mold bottom; one said last forming a second mold with said mold sides and the horizontally oriented mold bottoms; and means for rotating said carrier around an inclined axis, whereby the mold bottoms change places to permit continuous molding of a first sole portion and simultaneous completion of a two component sole.

* * * * *